US012726277B2

(12) United States Patent
Shiu

(10) Patent No.: US 12,726,277 B2
(45) Date of Patent: Sep. 1, 2026

(54) SINGLE-PHOTON TRANSMISSION DETERMINATION

(71) Applicant: Arqit Limited, London (GB)

(72) Inventor: Daniel Shiu, Gloucestershire (GB)

(73) Assignee: Arqit Limited, London (GB)

( * ) Notice: Subject to any disclaimer, the term of this patent is extended or adjusted under 35 U.S.C. 154(b) by 79 days.

(21) Appl. No.: 18/725,666

(22) PCT Filed: Jan. 5, 2023

(86) PCT No.: PCT/GB2023/050013

§ 371 (c)(1), (2) Date: Jun. 28, 2024

(87) PCT Pub. No.: WO2023/144502

PCT Pub. Date: Aug. 3, 2023

(65) Prior Publication Data

US 2025/0184011 A1 Jun. 5, 2025

(30) Foreign Application Priority Data

Jan. 28, 2022 (GB) ..................................... 2201157

(51) Int. Cl.
*H04L 9/08* (2006.01)
*H04B 10/70* (2013.01)
*H04L 9/00* (2022.01)

(52) U.S. Cl.
CPC ............ *H04B 10/70* (2013.01); *H04L 9/002* (2013.01); *H04L 9/0858* (2013.01)

(58) Field of Classification Search
None
See application file for complete search history.

(56) References Cited

U.S. PATENT DOCUMENTS 12,244,701 B2 * 3/2025 Guo .................. G02B 27/0068
2016/0070093 A1 * 3/2016 Simpson ........... G01N 15/1429 348/80

(Continued)

OTHER PUBLICATIONS

Improved key-rate bounds for practical decoy-state quantum-key-distribution systems (Year: 2017).*

(Continued)

*Primary Examiner* — Trang T Doan
(74) *Attorney, Agent, or Firm* — Dentons US LLP

(57) ABSTRACT

A computer-implemented method for determining a lower-bound for the number of successful single-photon transmissions from a transmitter to a receiver, wherein for multiple transmissions, one or more parameters may be selected from a plurality of predetermined discrete values, the method including determining, for each value, the number of transmissions sent by the transmitter having said value; determining, for each value, the number of transmissions received by the receiver having said value; and determining an estimator based on: the determined number of sent transmissions corresponding to each of the values, the determined number of received transmissions corresponding to each of the values, and a plurality of statistical parameters each associated with a statistical model of the number of photons sent per transmission from the transmitter for a respective value of the parameters, whereby the estimator is a lower-bound for successful single-photon transmissions and is strictly non-positively biased.

19 Claims, 4 Drawing Sheets

(56) References Cited

U.S. PATENT DOCUMENTS

| | | | | |
|---|---|---|---|---|
| 2016/0241396 | A1* | 8/2016 | Fu | H04L 9/0836 |
| 2018/0368810 | A1* | 12/2018 | Sboros | A61B 8/5207 |
| 2022/0198611 | A1* | 6/2022 | Jia | H04N 1/00132 |
| 2023/0204514 | A1* | 6/2023 | Donnert | G02B 21/0032 356/317 |
| 2023/0251479 | A1* | 8/2023 | Schmidt | G02B 21/0036 250/459.1 |
| 2024/0111029 | A1* | 4/2024 | Ono | G02B 26/105 |

OTHER PUBLICATIONS

Fei Yang-Yang et al., Practical decoy state quantum key distribution with detector efficiency mismatch, The European Physical Journal D, Springer Berlin Heidelberg, Berlin/Heidelberg, vol. 72, No. 6, Jun. 12, 2018, pp. 1-6, XP036523606.

Zhang Z. et al., Improved key-rate bounds for practical decoy-state quantum-key-distribution systems, Physical Review A Jan. 27, 2017 American Physical Society USA, vol. 95, No. 1, Jan. 27, 2017, XP002807621.

Mailloux Logan O et al., Quantum key distribution: examination of the decoy state protocol, IEEE Communications Magazine, IEEE Service Center, Piscataway, US, vol. 53, No. 10, Oct. 1, 2015, pp. 24-31, XP011586387.

Trushechkin A S et al., Security of the decoy state method for quantum key distribution, ARXIV.org, Cornell University Library, 201 Olin Library Cornell University Ithaca, NY 14853, Mar. 27, 2021, XP081902075.

* cited by examiner

SINGLE-PHOTON TRANSMISSION DETERMINATION

This application is the National Stage filing under 35 U.S.C. 371 of International Application No. PCT/GB2023/050013, filed Jan. 5, 2023, claims the benefit of GB Application No. 2201157.1, filed Jan. 28, 2022, the contents of which are all hereby incorporated by reference herein in their entirety.

FIELD OF THE INVENTION

The present application relates to methods and systems for determining a lower-bound for the number of successful single-photon transmissions between a transmitter and a receiver. In particular, although not exclusively, the present invention relates to such methods and systems employed in quantum communication networks for secure quantum key distribution.

BACKGROUND TO THE INVENTION

Quantum key distribution (QKD) methods and systems are vulnerable to so-called "photon-splitting attacks". Photon-splitting attacks are possible because a photon source cannot produce exactly one photon in each emission with 100% reliability. Instead, sometimes, the photon source will produce zero, two, or more photons in a single emission. It may be impossible to predict which emissions of a transmitter will successfully produce a single-photon and which emissions will produce zero, two, or more photons. Additionally, a photon detector may not successfully detect (or receive) all of the photons associated with each emission. In other words, the photon detector's reception of photons is also not 100% reliable. This means that it may not be possible to determine with sufficient reliability which emissions bursts comprise excess photons.

Excess photons may be collected by an eavesdropper, conventionally referred to as "Eve" without the communicating parties ("Alice" and "Bob") becoming aware of Eve's interference. When Alice and Bob are transmitting photon streams between them to establish a quantum-secure key by a QKD protocol, Eve may be able to collect the excess photons and use them to obtain information regarding the key being established between Alice and Bob, thereby reducing the security of Alice and Bob's communication channel without the knowledge of Alice or Bob.

The inventors have devised the claimed invention in light of the above considerations.

The embodiments described below are not limited to implementations which solve any or all of the disadvantages of the known approaches described above.

SUMMARY OF INVENTION

This Summary is provided to introduce a selection of concepts in a simplified form that are further described below in the Detailed Description. This Summary is not intended to identify key features or essential features of the claimed subject matter; variants and alternative features which facilitate the working of the invention and/or serve to achieve a substantially similar technical effect should be considered as falling into the scope of the invention.

The invention is defined as set out in the appended set of claims.

In a first aspect of the present invention, there is provided a computer-implemented method for determining a lower-bound on the number of successful single-photon transmissions from a transmitter to a receiver, wherein for a plurality of transmissions, one or more parameters of each of the transmissions may be selected from a plurality of predetermined discrete values, and the method comprises: determining, for each value of each of the one or more parameters, the number of transmissions transmitted by the transmitter having said value; determining, for each value of each of the one or more parameters, the number of transmissions received by the receiver having said value; determining an estimator based on: the determined number of transmitted transmissions corresponding to each of the values of the one or more parameters, the determined number of received transmissions corresponding to each of the values of the one or more parameters, and a plurality of statistical parameters, wherein each statistical parameter is associated with a statistical model of the number of photons transmitted per transmission from the transmitter for a respective value of the one or more parameters, wherein the estimator is a lower-bound for the number of successful single-photon transmissions between the transmitter and the receiver, and wherein the estimator is strictly non-positively biased.

By determining the estimator in this way, it is possible to provide an estimator that has a small, but strictly non-positive bias. In some examples, the estimator may be strictly negatively biased. Further, the estimator determined in the way described above may have a low variance. This means that the probability of the estimator over-estimating the lower bound for the number of successful single-photon transmissions is vanishingly small (and this probability can be effectively bounded). Indeed the estimator will be precise (close to the true number of successful single-photon transmissions) but will consistently slightly under-estimate the number of successful single-photon transmissions in cases where there is a difference between the value of the estimator and the true number of successful single-photon transmissions.

In some embodiments, the method may further comprise: agreeing a quantum-secure key between the transmitter and the receiver based on a number of the transmissions between the transmitter and the receiver, wherein the number of transmissions on which agreeing the quantum-secure key is based is no more than the lower-bound for the number of successful single-photon transmissions between the transmitter and the receiver.

In this way, a quantum-secure key may be agreed between the transmitter and the receiver in a way that is robustly secure against photon-splitting attacks, such as those described above.

In some embodiments, determining the estimator may comprise determining a linear combination of one or more of: the determined number of transmitted transmissions corresponding to each of the values of the one or more parameters, the determined number of received transmissions corresponding to each of the values of the one or more parameters, and the plurality of statistical parameters.

Estimators comprising linear combinations may benefit from a smaller bias and a lower variance than estimators in other forms, particularly quadratic or higher-order estimators. By providing a linear estimator, the variance of the estimator is thereby further reduced.

In some embodiments, the estimator may comprise a plurality of terms, each term being respectively associated with a different one of the values of the one or more parameters.

In this way, the number of terms defining the estimator may be reduced so that there is a one-to-one correlation between the number of values of the one or more parameters and the number of terms in the estimator. By eliminating redundant terms (i.e., ensuring that no two terms are associated with the same value of the one or more parameters), the variance of the estimator may be reduced.

In some embodiments, each of the statistical models may be fully defined by its respective statistical parameter.

In this way, the statistical model may be considered to be a single-variable model. This may simplify the determination of the estimator, thereby reducing the computational requirements needed to determine the lower-bound. Reducing the computational burden of determining the lower-bound permits the use of standard computational units without the need for bespoke software and/or hardware and eliminates the need for excessively large memories.

In some embodiments, each of the statistical models may be a Poisson distribution and each of the plurality of statistical parameters may be the respective mean values of each Poisson distribution.

The Poisson distribution is a statistical model that may be a good (i.e., reliable) model for the transmission of photons between a transmitter and receiver. The Poisson distribution is a discrete probability distribution that may represent the probability of the number of photons in each emission burst by the transmitter. For example, the probability of each emission burst consisting of k photons may be represented as: $P(X=k)=\lambda^k e^{-\lambda}/k!$, where $\lambda$ represents the mean average (and the variance) of the Poisson distribution. The Poisson distribution is suitable for modelling systems where separate events are independent of one another and the variables are discrete, i.e. not continuous, variables.

In some embodiments, the one or more parameters may include a signal intensity for the transmission.

In some embodiments, the plurality of predetermined discrete values may comprise a plurality of different values for the intensity of the signal.

In some embodiments, the plurality of discrete values may include at least three values, wherein transmissions having the first signal intensity are designated as transmissions in a signal state, and transmissions having each of the at least two other signal intensities are designated as transmissions in respectively different decoy states.

In some embodiments, the method may further comprise: using the estimator to determine a lower-bound on the number of successful single-photon transmissions across the signal state and each of the decoy states; and determining a key rate for a quantum key distribution process based on the lower-bound.

Decoy states are a known tool in quantum key distribution for mitigating the risk of photon-splitting attacks, as set out in "Quantum Key Distribution with High Loss: Toward Global Secure Communication", W.-Y. Hwang, *Phys. Rev. Lett.,* 91, 057901 (2003). Decoy states are low-powered emissions of photons that emit weaker photon bursts than are optimal. A photon source can be configured to randomly emit according to one or more decoy states or a signal state. Although the probability of more than one photon being included in an emission burst is smaller when emitting in a decoy state, the probability of reception given the number of photons emitted is independent of that state. Therefore, differences between the number of receptions for the various states allows an inference of the probability of reception for a single photon transmission. Meanwhile, an eavesdropper—or adversary—would not be able to discern whether any given photon burst was emitted in one of the decoy states or the signal state; they would only be able to detect the number of photons in the emission burst. The methods described herein are useful in QKD systems employing decoy states because of the improved reliability and precision of the estimator for the lower-bound of the number of successful single-photon transmissions between the transmitter and the receiver. This allows a larger proportion of transmissions to be used in the determination of a quantum secure key. In other words, a quantum-secure key can be securely agreed and distributed using fewer transmissions and with a higher degree of security making the process of quantum key distribution both more secure and more efficient.

In some embodiments, the one or more parameters may include a polarisation angle for the transmission.

In some embodiments, the plurality of predetermined discrete values may comprise a plurality of predetermined angles, wherein the transmitter may be configured to transmit photons with a polarisation angle according to any of the predetermined angles.

In some embodiments, the one or more parameters may include a detection angle of the receiver.

In some embodiments, the plurality of predetermined discrete values may comprise a plurality of predetermined polarisation angles, wherein the receiver may be configured to orient a detector with a detection angle aligned with any of the predetermined polarisation angles, such that the reception of a transmitted photon is maximised for photons whose polarisation angle is aligned with the detection angle.

In some embodiments, the method may further comprise determining an estimate of the error rate associated with the transmissions, wherein the error rate is indicative of the proportion of transmissions that are not successfully received by the receiver.

The estimator described for determining the number of successful single-photon transmissions may also be used to determine the error rate of transmissions between the transmitter and the receiver. As discussed herein, the estimator of the methods described herein benefits from a low, strictly non-positive bias and a lower variance than achievable in other methods employed in the state of the art. For example, an estimator obtained by the methods described herein may have a lower variance over estimators obtained by methods employed in the state of the art by a factor of 1.25 or more, 1.5 or more, 2 or more, 3 or more, 4 or more, or 5 or more. Similarly, such an estimator may also have a lower bias by over conventional estimators by a factor of 1.25 or more, 1.5 or more, 2 or more, 3 or more, 4 or more, or 5 or more. In one particular embodiment, the estimator obtained by the methods described herein and consisting of three terms may have a lower variance than an equivalent estimator obtained by a method employed in the state of the art (consisting typically of 5 terms) by a factor of 1.667. In the same embodiment, the estimator obtained by the methods described herein may have a lower bias than the estimator obtained by the method employed in the state of the art by a factor of 3. This improved reliability and precision are also beneficial for the determination of an error rate.

In some embodiments, the transmitter may be a satellite for use in a quantum communication network.

In some embodiments, the receiver may be a ground station for use in a quantum communication network.

In some embodiments, the method may further comprise updating the estimator to define the lower-bound with a required level of confidence.

In some embodiments, updating the estimator may involve determining a Chernoff bound of the estimator. A Chernoff bound defines an exponentially decreasing bound on the tail distribution for the sum of independent variables.

Other bounds may also be used based on, for example, Markov's inequality or Chebyshev's inequality. However, in the context of the methods described herein, the Chernoff bound may provide the benefit of a sharper boundary than is achievable with other bounding methods.

In some embodiments, determining the estimator may comprise: for each of the plurality of statistical parameters, $\lambda_i$, determining a respective coefficient, $$c_i = e^{\lambda_i} \times \frac{\sum_{j\neq i} \lambda_j^2}{\prod_{j\neq i} (-1)^{j-i}(\lambda_j - \lambda_i)};$$

and determining the estimator, $Y=\Sigma_i c_i M_i/N_i$, wherein $N_i$ represents the determined number of transmitted transmissions corresponding to each of the values of the one or more parameters and $M_i$ represents the determined number of received transmissions corresponding to each of the values of the one or more parameters.

This particular set of equations, as is discussed below, is a particular example that provides an estimator with a very low, strictly bias that is preferable to known methods in the state of the art. This particular set of equations is applicable at least to estimators consisting of two or three terms.

In some embodiments, the one or more parameters may consist of a signal intensity for the transmissions, and the plurality of discrete values may consist of three values for the signal intensity, wherein transmissions having the first signal intensity are designated as transmissions in a signal state, transmissions having the second signal intensity are designated as transmissions in a first decoy state, and transmissions having the third signal intensity are designated as transmissions in a second decoy state.

In some embodiments, the method may further comprise: updating the estimator to define the lower-bound with a required level of confidence, wherein the estimator may be of the form:

$$Y' = c_1(1+\delta_1)\frac{M_1}{N_1} + c_2(1-\delta_2)\frac{M_2}{N_2} + c_3(1+\delta_3)\frac{M_3}{N_3};$$

wherein the three correction factors, $\delta_1$, $\delta_2$, $\delta_3$, are determined based on the required level of confidence, $1-\epsilon$, wherein the first correction factor is a root of the equation: $-\delta_1+\log(1+\delta_1)=(\log \epsilon)/M_1$, wherein the second correction factor is a root of the equation: $\delta_2+\log(1-\delta_2)=(\log \epsilon)/M_2$, wherein the third correction factor is a root of the equation: $-\delta_3+\log(1+\delta_3)=(\log \epsilon)/M_3$.

In some embodiments, the three correction factors may be determined based on respective estimates, wherein the first correction factor is estimated as:

$$\delta_1 = \frac{1}{6} \times \left(-4\beta_1 + \sqrt{16\beta_1^2 - 72\beta_1}\right),$$

wherein the term $\beta_1$ is determined as $\beta_1=(\log \epsilon)/M_1$, wherein the second correction factor is estimated as:

$$\delta_2 = \left[12\beta_2 + \sqrt{144\beta_2^2 - 72\beta_2(9-\beta_2)}\right]/[18 - 2\beta_2],$$

wherein the term $\beta_2$ is determined as $\beta_2=(\log \epsilon)/M_2$, and wherein the first correction factor is estimated as:

$$\delta_3 = \frac{1}{6} \times \left(-4\beta_3 + \sqrt{16\beta_3^2 - 72\beta_3}\right),$$

wherein the term $\beta_3$ is determined as $\beta_3=(\log \epsilon)/M_3$.

As discussed in more detail below, this particular set of equations provides a highly reliable and precise estimate for the number of successful single-photon transmissions between the transmitter and the receiver.

In some embodiments, the estimator is strictly negatively biased

In a further aspect of the invention, there is provided a computer comprising a processor configured to carry out the methods described herein.

In a further aspect of the invention, there is provided a quantum communication network: comprising a transmitter configured to transmit photons; a receiver configured to receive photons from the transmitter; and a computer as described herein.

In some embodiments, the transmitter may be configured to selectively transmit photons in different polarisations for generating a quantum key for encrypted communications, and the receiver may be configured to measure received photons using one or more different polarisation bases.

In some embodiments, the transmitter may be configured to selectively transmit photons at different intensities.

In some embodiments, the quantum communication network may be a satellite-based communication network.

In some embodiments, the transmitter may be on-board a satellite.

In some embodiments, the receiver may be on-board a ground station.

In some embodiments, the quantum communication network may further comprise a burst counter configured to: receive a series of data items, wherein each data item is associated with a respective transmission of a burst of photons by the transmitter; aggregate the series of data items to determine the number of bursts of photons transmitted by the transmitter; and transmit the determined number of transmitted bursts to the computer.

In some embodiments, the burst counter may be included in the transmitter. In other examples, the burst counter may be remote from the transmitter. For example, the burst counter may be included in the receiver or in a different apparatus or server system altogether.

In some embodiments, the computer may be included in the receiver. In other examples, the computer may be remote from the receiver. For example, the computer may be included in the transmitter or in a different apparatus or server system altogether.

In some embodiments, the quantum communication network may further comprise: one or more further transmitters, and/or one or more further receivers.

In a further aspect of the invention, there is provided a computer program comprising instructions which, when the program is executed by a computer, cause the computer to carry out the methods described herein.

In a further aspect of the invention, there is provided a computer-readable medium comprising logic which, when executed by a computer, cause the computer to carry out the methods described herein.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is issued for designing silicon chips, or for configuring universal programmable chips, to carry out desired functions.

The features and embodiments discussed above may be combined as appropriate, as would be apparent to a person skilled in the art, and may be combined with any of the aspects of the invention except where it is expressly provided that such a combination is not possible or the person skilled in the art would understand that such a combination is self-evidently not possible.

BRIEF DESCRIPTION OF THE DRAWINGS

Embodiments of the present invention are described below, by way of example, with reference to the following drawings.

Figure 1:
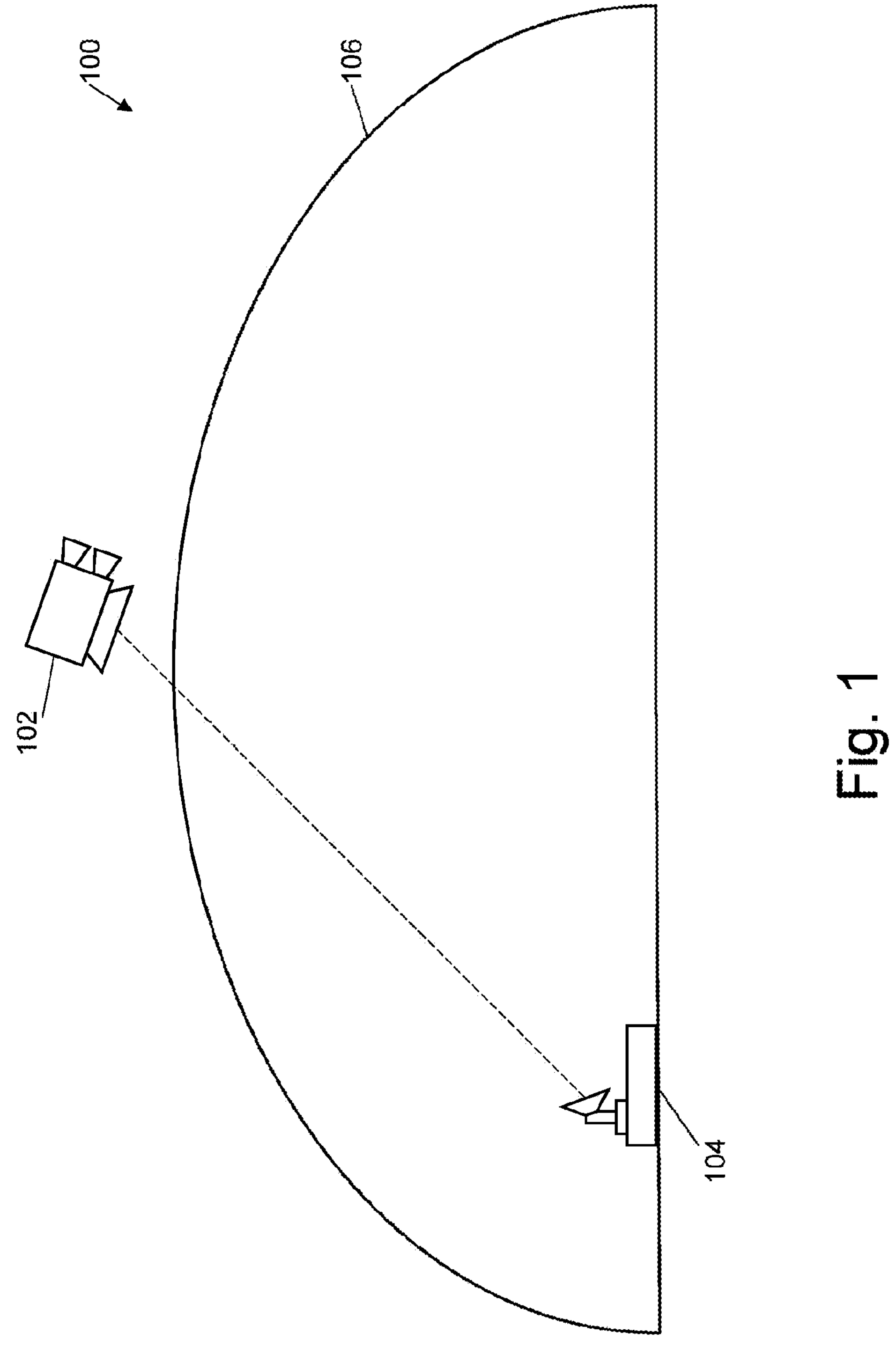
FIG. 1 depicts a satellite-based quantum communication network.

Common reference numerals are used throughout the figures to indicate the same or similar features.

DETAILED DESCRIPTION

Embodiments of the present invention are described below by way of example only. These examples represent the best mode of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

FIG. 1 depicts a satellite-based quantum communication network configurable to carry out the methods described herein.

The quantum communication network 100 comprises one or more satellites 102 communicatively linked with one or more ground stations 104 on the surface of the Earth 106. For simplicity, only one satellite 102 and one ground station 104 are shown in FIG. 1, but the quantum communication network 100 may comprise a plurality of satellites 102 and or a plurality of ground stations 104. The plurality of satellites 102 may be each communicatively linked with each other and/or may be communicatively linked with one or more (or all) of the ground stations 104. Similarly the plurality of ground stations 104 may be each communicatively linked with each other and/or may be communicatively linked with one or more (or all) of the satellites 102. A satellite 102 may be communicatively linked with one of the ground stations 104 when the satellite passes over the ground station in the course of its orbit around the Earth 106.

Figure 2:
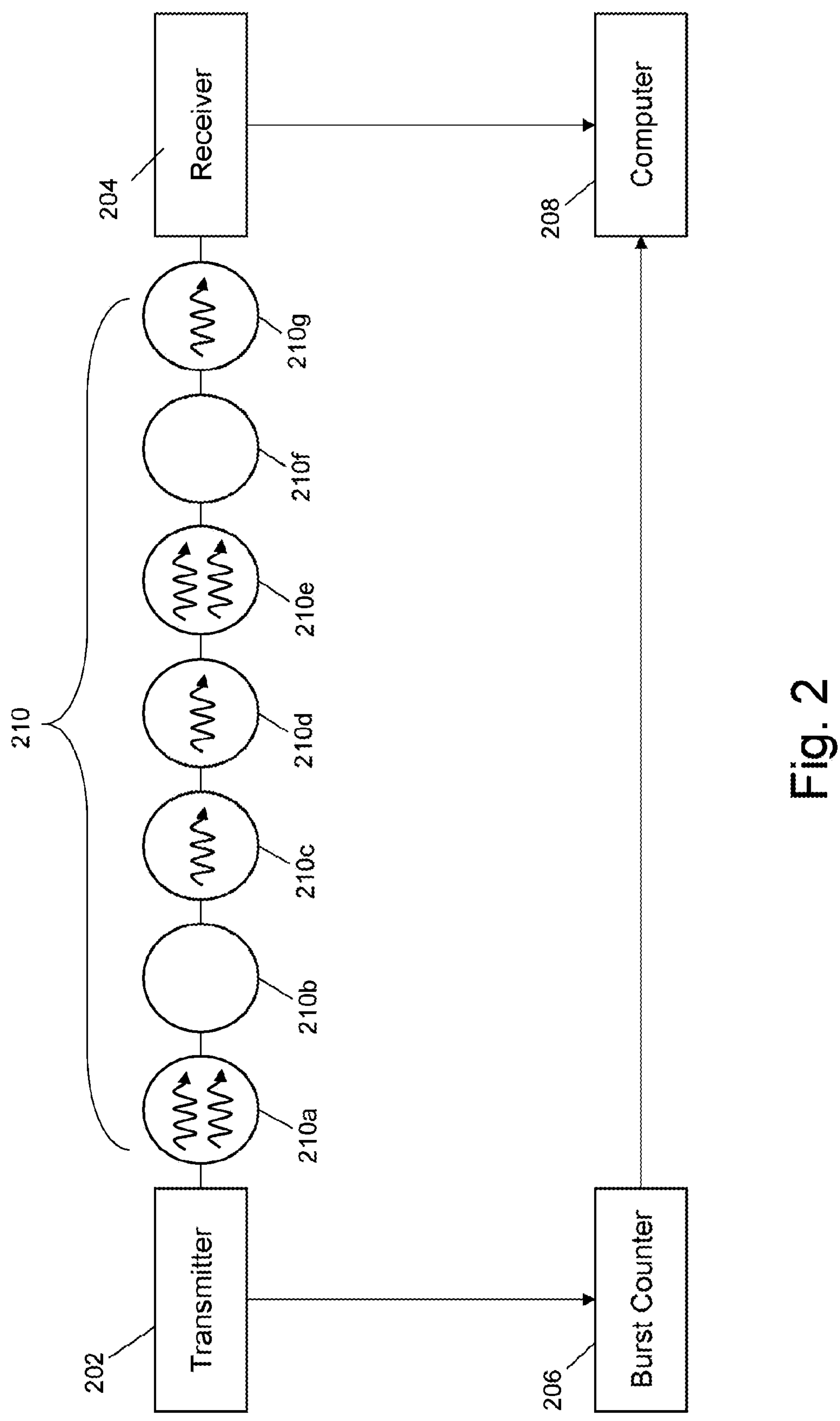
FIG. 2 depicts a schematic of a quantum communication network configured to carry out the methods described herein.

FIG. 2 depicts a schematic of a quantum communication network configured to carry out the methods described herein. The quantum communication network comprises a transmitter 202, a receiver 204, a burst counter 206 and a computer 208. The transmitter 202 comprises a photon source that transmits photons in discrete bursts 210 (also called emissions) towards the receiver 204. The receiver 204 comprises a detector that detects each of the discrete bursts 210.

The photon source of the transmitter 202 may generate zero, one, two or more photons for each transmission. For example, photon bursts 210*b* and 210*f* may consist of zero photons, photon bursts 210*c*, 210*d* and 210*g* may consist of one photon, and photon bursts 210*a*, 210*e* may consist of two photons. Other photon bursts not depicted in FIG. 2 may consist of zero, one, two, or more photons.

The transmitter 202 may reliably generate photons according to a statistical distribution based on one or more statistical parameters. For example, the statistical model may be a Poisson distribution, and the one or more statistical parameters may correspondingly consist of a single Poisson parameter. The transmitter 202 is configured to transmit photon bursts; each burst is defined—at least in part—by one or more parameters. Each of the one or more parameters may be tuned by the transmitter to have one of a respective plurality of values.

For example, the one or more parameters may include polarisation, and the transmitter may be configured to transmit photon bursts selectively in one of two, three, or more polarisations. Transmitting (and receiving) in different polarisations may be necessary for generating and agreeing a quantum key with the receiver in some QKD systems. Of course, the skilled person will be aware of alternative QKD systems wherein transmission (and reception) in different polarisations may not be a requirement for generating and agreeing the quantum key. Additionally or alternatively, the one or more parameters may include basis, and the transmitter may be configured to transmit photon bursts selectively in one of two, three, or more bases. For example, the transmitter may be configured to selectively transmit photons in a first basis defined by orthogonal linear polarisations (e.g., vertical and horizontal polarisations) or a second basis defined by orthogonal circular polarisations (e.g. left- and right-circular polarisations). The selection of basis by the transmitter may be combined with the selection of polarisation in a two-step process. For example, the transmitter may first select a basis and then select one of the available polarisations in the selected basis. Additionally or alternatively, the one or more parameters may include intensity, and the transmitter may be configured to transmit photon bursts selectively with one of two, three, or more intensities—also referred to as transmission strengths. A first intensity may correspond to a so-called signal state, while the second, third and any subsequent intensity may correspond to first second, and subsequent decoy states. As discussed above, decoy states are a tool for mitigating the risk of photon-splitting attacks.

In examples where the one or more parameters include polarisation, the detector of the receiver 204 may be oriented at one of a plurality of detection angles, selected based on the basis state and/or polarisation angle selected by the transmitter. In some examples the detection angle may be selected such that the reception efficiency is maximised for a transmitted photon whose polarisation angle is aligned with the detection angle.

The burst counter 206 is configured to count the total number of photon emissions bursts transmitted for each value of each of the one or more parameters. For example, in examples where the one or more parameters include signal intensity and polarisation, the burst counter 206 is configured to keep track of the total number of bursts transmitted in each transmission strength and at each polarisation angle.

In some examples, the transmitter 202 and the burst counter 206 may be components of the same computational unit.

Once all transmissions by the transmitter 202 and receptions by the receiver 204 have been completed, the burst counter 206 may be configured to transmit a message to the computer 208 indicating the transmission strength and, optionally, polarisation and basis for each photon emission burst 210. This allows the computer 208 to determine the total number of photon emission bursts 210 in each state (i.e., each polarisation and each transmission strength either separately or combined).

In some examples, the receiver 204 and the computer 208 may be components of the same computational unit.

The computer 208 is configured to determine a lower-bound for the number of successful single-photon transmissions from the transmitter 202 to the receiver 204 based on the number of transmissions counted by the burst counter 206, the number of successful receptions by the receiver 204, and the statistical model that models the photon emission bursts 210 from the transmitter 202.

The transmitter 202 and receiver 204 are configured to use the determined lower-bound for the number of successful single-photon transmissions between the transmitter 202 and the receiver 204 to agree a quantum-secure key between themselves based on a subset of the total number of transmissions between the transmitter 202 and the receiver 204. The number of transmissions in this subset is no more than the lower-bound for the number of successful single-photon transmissions between the transmitter and the receiver. In this way, the agreement of the key between the transmitter and the receiver 204 may be more robust against the so-called "photon-splitting" attacks. In some examples, the communication channel by which the quantum-secure key is agreed may be a classical communication channel through which the transmitter 202 and receiver 204 communicate information such as which orientation or basis they transmitted or detected photons in for each of the photon transmission bursts.

As discussed above, it is beneficial for QKD methods to provide a defence against "photon-splitting" attacks. Any given photon source or transmitter 202 cannot, with 100% reliability, produce exactly one photon for each emission. In some instances, the transmitter will produce zero, two or possibly more photons. Any excess photons could be collected by an adversary who would then gain information about an encryption key that has been generated and agreed upon based on photon transmissions 210*a*, 210*e* comprising more than one photon. To ensure that the generated and agreed upon keys are based only on information securely encoded in single-photon emissions 210*c*,210*d*, 210*g*, the computer 208 is configured to determine the lower-bound for the number of successful single-photon transmissions from the transmitter 202 to the receiver 204.

Figure 3:
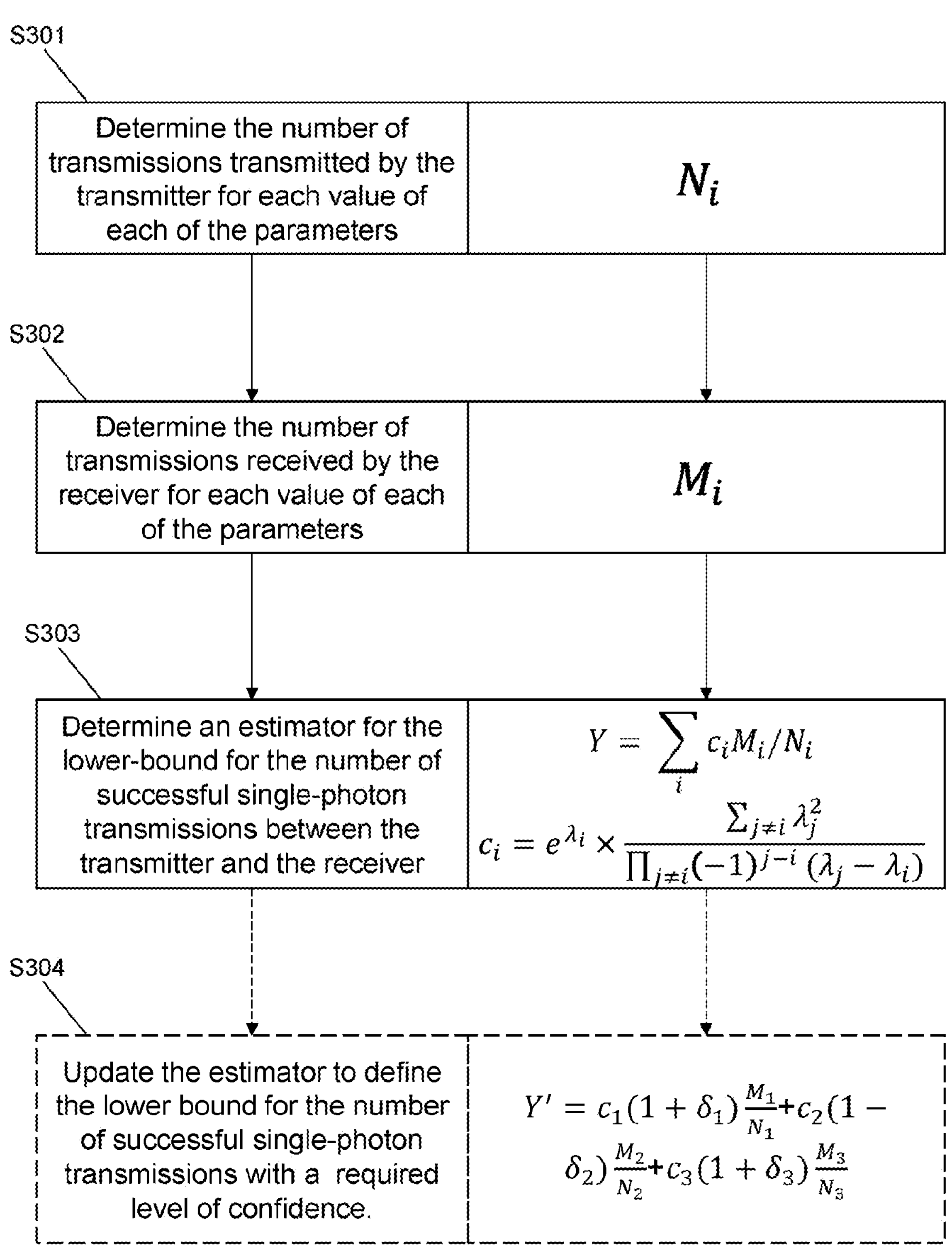
FIG. 3 depicts a method for determining a lower-bound for the number of successful single-photon transmissions from a transmitter to a receiver accompanied by terms and equations that may be used to determine the estimator.

FIG. 3 depicts a method for determining a lower-bound for the number of successful single-photon transmissions between the transmitter 202 and receiver of 204 of FIG. 2. First, in operation S301, the number of transmissions transmitted by the transmitter 202 for each value of each of the parameters is determined. This operation may be performed by the burst counter 206 shown in FIG. 2. Simultaneously with or subsequent to operation S301, the number of transmissions received by the receiver 204 for each value of each of the parameters is determined in operation S302. The operation S302 may be performed by the receiver 204 shown in FIG. 2. The determined number of transmitted and received transmissions may be sent to the computer 208.

Subsequent to operations S301 and S302, in operation S303, an estimator for the lower-bound for the number of successful single-photon transmissions between the transmitter 202 and receiver 204 of FIG. 2 is determined. Operation S303 may be performed by the computer 208 shown in FIG. 3. The estimator is strictly non-positively biased and may comprise a linear combination of the received parameters—the determined number of transmitted and received transmissions, and the one or more statistical parameters defining the statistical model(s). The estimator may comprise a plurality of terms, each term being respectively associated with a different one of the values of the one or more parameters.

Subsequent to operation S303, in operation S304, the estimator may be update to define the lower-bound for the number of successful single-photon transmissions with a required level of confidence. Operation S304 may be performed by the computer 208 shown in FIG. 2. Updating the estimator may involve determining a Chernoff bound of the estimator.

In a particular example, the photon emission bursts 210 of the transmitter 202 can be modelled according to a series of independent Poisson distributions, each having their own Poisson parameter. In some examples, the estimator, Y, may be determined as:

$$Y = \sum_i c_i \frac{M_i}{N_i}$$

where Y is a linear combination of terms. Each term corresponds to one of the values of one of the one or more parameters.

The coefficient, $c_i$, may be determined generally as:

$$c_i = e^{\lambda_i} \times \frac{\sum_{j \neq i} \lambda_j^2}{\prod_{j \neq i} (-1)^{j-i} (\lambda_j - \lambda_i)}$$

where $\lambda_{i,j}$ are the plurality of Poisson parameters defining each of the Poisson distributions. For example, for each signal transmission strength, there may be a separate Poisson distribution. As discussed above the above equation is applicable to at least estimators consisting of either two or three terms The terms, $M_i$ and $N_i$ define the number of transmissions transmitted and received for each value of each of the one or more parameters respectively.

The updated estimator may be determined generally as:

$$Y' = \sum_i c_i(1 \pm \delta_i)\frac{M_i}{N_i}$$

where for negative $c_i$ the correction factor, $1+\delta_i$, may be determined as a root of:

$$-\delta_i + \log(1+\delta_i) = \frac{\log \epsilon_i}{M_i}$$

and for positive $c_i$ the correction factor, $1-\delta_i$ may be determined as a root of $$\delta_i + \log(1-\delta_i) = \frac{\log \epsilon_i}{M_i}$$

where the required level of confidence is defined numerically as $1-\Sigma_i \epsilon_i$.

In a particular example, the one or more parameters may consist of a signal intensity for the transmission, and the plurality of values for the signal intensity may consist of three values for the signal intensity—or transmission strength. Transmissions having the first signal intensity, or transmission strength, may be designated as transmissions in a signal state, while transmissions having the second and third signal intensity, or transmission strength, may be designated as transmissions in first and second decoy states respectively.

In this example, the estimator may be determined as:

$$Y = c_1\frac{M_1}{N_1} + c_2\frac{M_2}{N_2} + c_3\frac{M_3}{N_3}$$

where $\lambda_1>\lambda_2>\lambda_3$ and:

$$c_1 = \frac{(\lambda_2^2-\lambda_3^2)e^{\lambda_1}}{(\lambda_1-\lambda_2)(\lambda_2-\lambda_3)(\lambda_3-\lambda_1)}$$

$$c_2 = \frac{(\lambda_3^2-\lambda_1^2)e^{\lambda_2}}{(\lambda_1-\lambda_2)(\lambda_2-\lambda_3)(\lambda_3-\lambda_1)}$$

$$c_3 = \frac{(\lambda_1^2-\lambda_2^2)e^{\lambda_3}}{(\lambda_1-\lambda_2)(\lambda_2-\lambda_3)(\lambda_3-\lambda_1)}$$

The updated estimator may be determined as:

$$Y' > c_1(1+\delta_1)\frac{M_1}{N_1} + c_2(1-\delta_2)\frac{M_2}{N_2} + c_3(1+\delta_3)\frac{M_3}{N_3}$$

wherein the three correction factors, $\delta_1$, $\delta_2$, $\delta_3$, are determined based on the required level of confidence, $1-\Sigma_i \epsilon_i$, such that the first correction factor is determined as a root of the equation:

$$-\delta_1 + \log(1+\delta_1) = \frac{\log \epsilon}{M_1}$$

the second correction factor is determined as a root of the equation:

$$\delta_2 + \log(1-\delta_2) = \frac{\log \epsilon}{M_2}$$

and the third correction factor is determined as a root of the equation:

$$-\delta_3 + \log(1+\delta_3) = \frac{\log \epsilon}{M_3}$$

The updated estimator may define the lower-bound of the number of successful single-photon transmissions with a confidence of at least $1-\Sigma_i \epsilon_i$.

In some examples, the computational burden of determining the updated estimator by determining the three correction factors based on approximations of the form:

$$\delta_1 = \frac{1}{6}\times\left[-4\beta_1 + \sqrt{16\beta_1^2 - 72\beta_1}\right]$$

$$\delta_2 = \frac{12\beta_2 + \sqrt{144\beta_2^2 - 72(9-\beta_2)}}{18-2\beta_2}$$

$$\delta_3 = \frac{1}{6}\times\left[-4\beta_3 + \sqrt{16\beta_3^2 - 72\beta_3}\right]$$

where:

$$\beta_i = \frac{\log \epsilon_i}{M_i}$$

These approximations may be used in place of the more precise equations listed above for a negligible reduction in overall accuracy.

In a particular example, the signal state may have a Poisson parameter $\lambda_1=0.55$, with $N_1=7.5\times10^{10}$ photon bursts 210 transmitted from the transmitter 202 in the signal state and $M_1=4.4\times10^6$ successful reception events at the receiver 204. The first decoy state may have a Poisson parameter $\lambda_2=0.15$, with $N_2=1.25\times10^{10}$ photon bursts 210 transmitted from the transmitter 202 in the first decoy state and $M_2=1.8\times10^5$ successful reception events at the receiver 204. The second decoy state may have a Poisson parameter $\lambda_3=0.015$ with $N_3=1.25\times10^{10}$ photon bursts 210 transmitted from the transmitter 202 in the second decoy state and $M_3=2.5\times10^4$ successful reception events at the receiver 204.

Accordingly the ratio of successful transmissions to receptions in the signal state is $5.867\times10^{-5}$. The ratio of successful transmissions to receptions in the first decoy state is $1.44\times10^{-5}$. Finally, the ratio of successful transmissions to receptions in the second decoy state is $2.000\times10^{-6}$.

The three estimator coefficients are therefore determined as:

$c_1=-1.336$ $c_2=12.156$ $c_3=-9.838$

From these determinations, the initial estimator can be determined as:

$$Y = -7.84\times10^{-5} + 1.750\times10^{-4} - 1.968\times10^{-5} = 7.697\times10^{-5}$$

If the required confidence level is 3 parts in 10 billion (i.e., $\Sigma_i \epsilon_i = 3\times10^{-1}$, e.g. $\epsilon_1 = \epsilon_2 = \epsilon_3 = 10^{-10}$), then the three correction coefficients may be determined as either:

$\delta_1 = 0.003276$ $\delta_2 = 0.01591$ $\delta_3 = 0.04354$ based on the precise equations above, or as:

$\delta_1 = 0.003276$ $\delta_2 = 0.01591$ $\delta_3 = 0.04354$ based on the approximated equations above. In other words, the approximation is accurate to at least four significant figures.

From these correction factors, an updated estimator can be determined as:

$$Y' > 7.309\times10^{-5}$$

with a confidence of $1-3\times10^{-10}$.

Figures 4A, 4B:
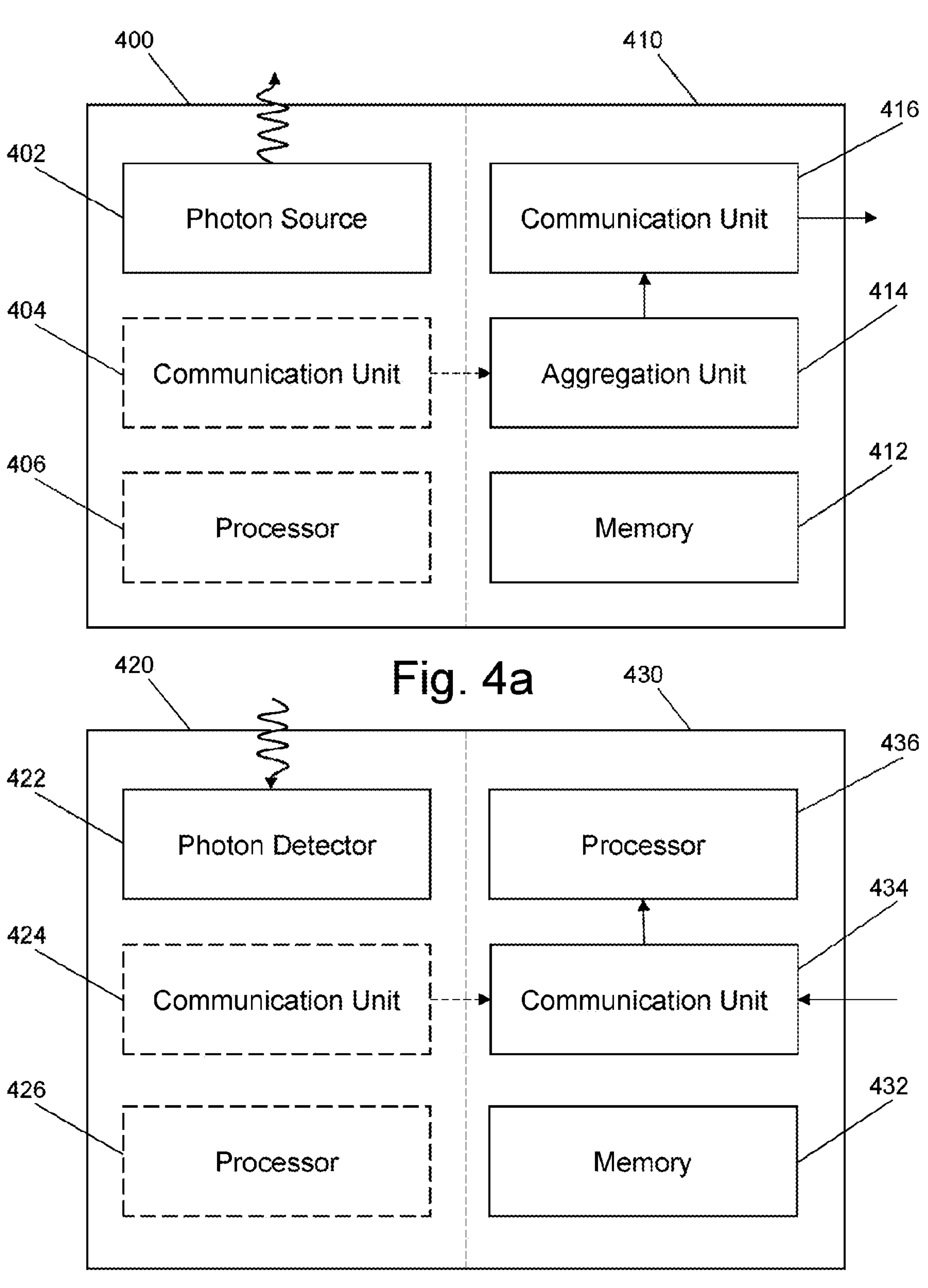
FIG. 4*a* depicts an apparatus configured to operate as a transmitter as described herein.
FIG. 4*b* depicts an apparatus configured to operate as a receiver as described herein.

FIG. 4*a* depicts an apparatus configured to operate as a transmitter as described herein. The apparatus 400 comprises a photon source 402 configured to emit photons in emission bursts 210 as described above. The transmitter apparatus 400 may further comprise a first communication unit 404 configured to transmit data indicative of each emission burst 210 to the burst counter 206, and a first processor 406 configurable to perform such logical operations and methods as required and described herein.

In some examples, as discussed above, the burst counter 206 may be separate from the transmitter 202. In other examples, the burst counter 206 may be a component of the same apparatus as the transmitter. In other words, the apparatus 410 for the burst counter 206 may either be separate from or contiguous with the apparatus 400 for the transmitter 202.

The burst counter apparatus 410 comprises a first memory 412 for storing aggregated data indicative of the total number of photon emission bursts for each discrete value of each of the one or more parameters (e.g., polarisation, basis state, transmission strength).

The first communication unit 404 of the transmitter apparatus 400 may be configured to transmit the data indicative of each emission burst 210 to the aggregation unit 414 of the burst counter apparatus 410. The aggregation unit 414 may be configured to aggregate the data transmitted from the communication unit 404 to determine the total number of photon emission bursts 210 transmitted from the photon source 402 for each discrete value of each of the one or more parameters (e.g., polarisation, basis state, transmission strength).

The burst counter apparatus 410 further comprises a second communication unit 416. The second communication unit 416 is configured to communicate the aggregated data from the burst counter apparatus 410 to the computer 208 shown in FIG. 2.

FIG. 4*b* depicts an apparatus configured to operate as a receiver as described herein. The apparatus 420 comprises a photon detector 422 configured to detect the photons in the emissions bursts 210 as described above. The receiver apparatus 420 may further comprise a second communication unit 424 configured to transmit data indicative of each received emission burst 210 to the computer 208, and a second processor 426 configurable to perform such logical operations and methods as required and described herein.

In some examples, as discussed above, the computer 208 may be separate from the receiver 204. In other examples, the computer 208 may be a component of the same apparatus as the receiver. In other words, the apparatus 430 for the computer 208 may either be separate from or contiguous with the apparatus 420 for the receiver 204.

The computer apparatus 430 comprises a second memory 432 for storing the data used to determine the estimator for the lower-bound of the number of successful single-photon transmissions between the transmitter 202 and the receiver 204. This data may comprise: the total number of successfully transmitted photon emission bursts 210 for each discrete value of each of the one or more parameters, the total number of successfully received photon emission bursts 201 for each discrete value for each of the one or more parameters, and the statistical parameters defining each of the statistical models that model the photon emission bursts for each discrete value of each of the one or more parameters.

The computer apparatus 430 further comprises a third communication unit 434. The third communication unit is configured to receive data from the second communication unit 424 of the receiver apparatus 420 and the communication unit 416 of the burst counter apparatus 410.

The computer apparatus 430 further comprises a third processor 436 configured to perform such logical operations and methods as required and described herein. The operations and methods performed by the third processor 436 include the methods described herein to determine the estimator and, optionally, the updated estimator for the lower-bound of the number of successful single-photon transmissions between the transmitter 202 and the receiver 204.

The estimator determined in the methods described herein is subsequently useable in QKD systems and processes to ensure that no more key material is produced than the information securely encoded in single-photon transmissions by the transmitter 202. As discussed above, the estimator determined in accordance with the methods described herein has a lower variance and a higher precision than previously achievable and is strictly non-positively biased. In other words, the methods described herein result in the determination of an estimator that, when implemented in QKD systems and processes ensures that any generated and agreed key is based only on single-photon emissions from the transmitter 202 and does so in a more efficient way than previously achievable. In particular, by determining an estimator with a higher precision and lower variance, the estimator indicates a number of successful single-photon transmissions that is closer to the "true" value than would otherwise be achievable. Further, by ensuring that the estimator is strictly non-positively biased, it is ensured that the estimator never over-estimates the number of successful single-photon transmissions, thereby ensuring the security of the QKD system.

The embodiments described above are fully automatic. In some examples a user or operator of the system may manually instruct some steps of the method to be carried out.

In the described embodiments of the invention the system may be implemented as any form of a computing and/or electronic device. Such a device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

Various functions described herein can be implemented in hardware, software, or any combination thereof. If implemented in software, the functions can be stored on or transmitted over as one or more instructions or code on a computer-readable medium. Computer-readable media may include, for example, computer-readable storage media. Computer-readable storage media may include volatile or non-volatile, removable or non-removable media implemented in any method or technology for storage of information such as computer readable instructions, data structures, program modules or other data. A computer-readable storage media can be any available storage media that may be accessed by a computer. By way of example, and not limitation, such computer-readable storage media may comprise RAM, ROM, EEPROM, flash memory or other memory devices, CD-ROM or other optical disc storage, magnetic disc storage or other magnetic storage devices, or any other medium that can be used to carry or store desired program code in the form of instructions or data structures and that can be accessed by a computer. Disc and disk, as used herein, include compact disc (CD), laser disc, optical disc, digital versatile disc (DVD), floppy disk, and Blu-ray® disc (BD). Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fibre optic cable, twisted pair, DSL, or wireless technologies such as infrared, radio, and microwave are included in the definition of communication medium. Combinations of the above should also be included within the scope of computer-readable media.

Alternatively, or in addition, the functionality described herein can be performed, at least in part, by one or more hardware logic components. For example, and without limitation, hardware logic components that can be used may include Field-programmable Gate Arrays (FPGAs), Program-specific Integrated Circuits (ASICs), Program-specific Standard Products (ASSPs), System-on-a-chip systems (SOCs). Complex Programmable Logic Devices (CPLDs), etc.

Although illustrated as a single system, it is to be understood that the computing device may be a distributed system. Thus, for instance, several devices may be in communication by way of a network connection and may collectively perform tasks described as being performed by the computing device.

Although illustrated as a local device it will be appreciated that the computing device may be located remotely and accessed via a network or other communication link (for example using a communication interface).

The term 'computer' is used herein to refer to any device with processing capability such that it can execute instructions. Those skilled in the art will realise that such processing capabilities are incorporated into many different devices and therefore the term 'computer' includes PCs, servers, mobile telephones, personal digital assistants and many other devices.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

It will be understood that the benefits and advantages described above may relate to one embodiment or may relate to several embodiments. The embodiments are not limited to those that solve any or all of the stated problems or those that have any or all of the stated benefits and advantages. Variants should be considered to be included into the scope of the invention.

Any reference to 'an' item refers to one or more of those items. The term 'comprising' is used herein to mean including the method steps or elements identified, but that such steps or elements do not comprise an exclusive list and a method or apparatus may contain additional steps or elements.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something".

Further, to the extent that the term "includes" is used in either the detailed description or the claims, such term is intended to be inclusive in a manner similar to the term "comprising" as "comprising" is interpreted when employed as a transitional word in a claim.

Moreover, the acts described herein may comprise computer-executable instructions that can be implemented by one or more processors and/or stored on a computer-readable medium or media. The computer-executable instructions can include routines, sub-routines, programs, threads of execution, and/or the like. Still further, results of acts of the methods can be stored in a computer-readable medium, displayed on a display device, and/or the like.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

REFERENCES

"Quantum Key Distribution with High Loss: Toward Global Secure Communication", W.-Y. Hwang, *Phys. Rev. Lett.*, 91, 057901 (2003), doi: https://doi.org/10.1103/PhysRevLett.91.057901.

The invention claimed is:

1. A quantum communication network, comprising:

a transmitter configured to transmit photons;

a receiver configured to receive photons from the transmitter; and a computer comprising a processor configured to determine a lower-bound for a number of successful single-photon transmissions from the transmitter to the receiver, wherein for a plurality of transmissions, one or more parameters of each of the transmissions may be selected from a plurality of predetermined discrete values, wherein the processor is further configured to:

determine, for each value of each of the one or more parameters, the number of transmissions transmitted by the transmitter having said value;

determine, for each value of each of the one or more parameters, the number of transmissions received by the receiver having said value; and determine an estimator based on:

the determined number of transmitted transmissions corresponding to each of the values of the one or more parameters, the determined number of received transmissions corresponding to each of the values of the one or more parameters, and a plurality of statistical parameters, wherein each statistical parameter is associated with a statistical model of the number of photons transmitted per transmission from the transmitter for a respective value of the one or more parameters, wherein determining the estimator comprises:

for each of the plurality of statistical parameters, $\lambda_i$, determining a respective cofficient, $$c_i = e^{\lambda_i} \times \frac{\sum_{j \neq i} \lambda_j^2}{\prod_{j \neq i} (-1)^{j-i} (\lambda_j - \lambda_i)};$$

and determining the estimator, $Y = \Sigma_i c_i M_i / N_i$, wherein $N_i$ represents the determined number of transmitted transmissions corresponding to each of the values of the one or more parameters and $M_i$ represents the determined number of received transmissions corresponding to each of the values of the one or more parameters, wherein the estimator is a lower-bound for the number of successful single-photon transmissions between the transmitter and the receiver, and wherein the estimator is strictly non-positively biased.

2. The quantum communication network according to claim 1, wherein the transmitter is configured to selectively transmit photons in different polarisations for generating a quantum key for encrypted communications, and wherein the receiver is configured to measure received photons using one or more different polarisation bases.

3. The quantum communication network according to claim 1, wherein the transmitter is configured to selectively transmit photons at different intensities.

4. The quantum communication network according to claim 1, wherein the network is a satellite-based communication network.

5. The quantum communication network according to claim 4, wherein the transmitter is on-board a satellite.

6. The quantum communication network according to claim 4, wherein the receiver is on-board a ground station.

7. The quantum communication network according to claim 1, further comprising a burst counter configured to:

receive a series of data items, wherein each data item is associated with a respective transmission of a burst of photons by the transmitter;

aggregate the series of data items to determine the number of bursts of photons transmitted by the transmitter; and transmit the determined number of transmitted bursts to the computer.

8. The quantum communication network according to claim 7, wherein the burst counter is included in the transmitter.

9. The quantum communication network according to claim 1, wherein the computer is included in the receiver.

10. A computer-implemented method for determining a lower-bound for a number of successful single-photon transmissions from a transmitter to a receiver, wherein for a plurality of transmissions, one or more parameters of each of the transmissions may be selected from a plurality of predetermined discrete values, and the method comprises:

determining, for each value of each of the one or more parameters, the number of transmissions transmitted by the transmitter having said value;

determining, for each value of each of the one or more parameters, the number of transmissions received by the receiver having said value; and determining an estimator based on:

the determined number of transmitted transmissions corresponding to each of the values of the one or more parameters, the determined number of received transmissions corresponding to each of the values of the one or more parameters, and a plurality of statistical parameters, wherein each statistical parameter is associated with a statistical model of the number of photons transmitted per transmission from the transmitter for a respective value of the one or more parameters, wherein determining the estimator comprises:

for each of the plurality of statistical parameters, $\lambda_i$, determining a respective coefficient, $$c_i = e^{\lambda_i} \times \frac{\sum_{j \neq i} \lambda_j^2}{\prod_{j \neq i} (-1)^{j-i} (\lambda_j - \lambda_i)};$$

and determining the estimator, $Y=\Sigma_i c_i M_i/N_i$, wherein $N_i$ represents the determined number of transmitted transmissions corresponding to each of the values of the one or more parameters and $M_i$ represents the determined number of received transmissions corresponding to each of the values of the one or more parameters, wherein the estimator is a lower-bound for the number of successful single-photon transmissions between the transmitter and the receiver, and wherein the estimator is strictly non-positively biased.

11. The computer-implemented method according to claim 10, further comprising:

agreeing a quantum-secure key between the transmitter and the receiver based on a number of the transmissions between the transmitter and the receiver, wherein the number of transmissions on which agreeing the quantum-secure key is based is no more than the lower-bound for the number of successful single-photon transmissions between the transmitter and the receiver.

12. The computer-implemented method according to claim 10, wherein determining the estimator comprises determining a linear combination of:

the determined number of transmitted transmissions corresponding to each of the values of the one or more parameters, the determined number of received transmissions corresponding to each of the values of the one or more parameters, and the plurality of statistical parameters.

13. The computer-implemented method according to claim 10, wherein the estimator comprises a plurality of terms, each term being respectively associated with a different one of the values of the one or more parameters.

14. The computer-implemented method according to claim 10, further comprising: updating the estimator to define the lower-bound with a required level of confidence.

15. The computer-implemented method according to claim 10, wherein the one or more parameters consists of a signal intensity for the transmission, and the plurality of discrete values consists of three values for the signal intensity, wherein transmissions having a first signal intensity are designated as transmissions in a signal state, transmissions having a second signal intensity are designated as transmissions in a first decoy state, and transmissions having a third signal intensity are designated as transmissions in a second decoy state.

16. The computer-implemented method according to claim 15, further comprising: updating the estimator to define the lower-bound with a required level of confidence, wherein the updated estimator is of the form: $\hat{Y}$"=c_1 (1+δ_1) M_1/N_1+c_2 (1-δ_2) M_2/N_2+c_3 (1+δ_3) M_3/N_3;

wherein three correction factors, δ_1, δ_2, δ_3, are determined based on the required level of confidence, 1-∈, wherein a first correction factor (δ_1) of the three correction factors is a root of the equation: 8_1+log (1+8_1)=(log ∈)/M_1, wherein a second correction factor (δ_2) of the three correction factors is a root of the equation: 8_2+log (1-δ_2)=(log ∈)/M_2, and wherein a third correction factor (δ_3) of the three correction factors is a root of the equation: −8_3+log (1+8_3)=(log ∈)/M_3.

17. The computer-implemented method according to claim 16, wherein the three correction factors are determined based on respective estimates, wherein the first correction factor is estimated as: δ_1=1/6×[−4β_1+√(16β_1^2-72β_1)]

wherein the term β_1 is determined as β_1=⟦ (log ⟧ ∈)/M_1, wherein the second correction factor is estimated as: δ_2=[12β_2+√(144β_2^2-72β_2 (9-β_2))]/[18-2β_2], wherein the term β_2 is determined as β_2=⟦ (log ⟧ ∈)/M_2, and wherein the first correction factor is estimated as: δ_3=1/6×[−4β_3+√(16β_3^2-72β_3)], wherein the term β_3 is determined as β_3=⟦ (log ⟧ ∈)/M_3.

18. The computer-implemented method according to claim 10, wherein the estimator is strictly negatively biased.

19. A non-transitory computer-readable medium comprising logic which, when executed by a computer, causes the computer to determine a lower-bound for a number of successful single-photon transmissions from a transmitter to a receiver, wherein for a plurality of transmissions, one or more parameters of each of the transmissions may be selected from a plurality of predetermined discrete values, wherein the computer is further configured to:

determine, for each value of each of the one or more parameters, the number of transmissions transmitted by the transmitter having said value;

determine, for each value of each of the one or more parameters, the number of transmissions received by the receiver having said value; and determine an estimator based on:

the determined number of transmitted transmissions corresponding to each of the values of the one or more parameters, the determined number of received transmissions corresponding to each of the values of the one or more parameters, and a plurality of statistical parameters, wherein each statistical parameter is associated with a statistical model of the number of photons transmitted per transmission from the transmitter for a respective value of the one or more parameters, wherein determining the estimator comprises:

for each of the plurality of statistical parameters, $\lambda_i$, determining a respective coefficient, $$c_i = e^{\lambda_i} \times \frac{\sum_{j\neq i}\lambda_j^2}{\prod_{j\neq i}(-1)^{j-i}(\lambda_j-\lambda_i)};$$

and determining the estimator, $Y=\Sigma c_i M_i/N_i$, wherein N; represents the determined number of transmitted transmissions corresponding to each of the values of the one or more parameters and M; represents the determined number of received transmissions corresponding to each of the values of the one or more parameters, wherein the estimator is a lower-bound for the number of successful single-photon transmissions between the transmitter and the receiver, and wherein the estimator is strictly non-positively biased.

* * * * *